United States Patent
Engin et al.

(10) Patent No.: US 10,828,591 B2
(45) Date of Patent: Nov. 10, 2020

(54) METHOD FOR PRODUCING AT LEAST ONE ASH-FORMING MEANS FOR A PARTICULATE FILTER OF AN EXHAUST GAS SYSTEM OF A GASOLINE ENGINE

(71) Applicant: Dr. Ing. h.c. F. Porsche Aktiengesellschaft, Stuttgart (DE)

(72) Inventors: Lukas Engin, Ingersheim (DE); Michael Wessels, Bietigheim-Bissingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 5 days.

(21) Appl. No.: 16/441,046

(22) Filed: Jun. 14, 2019

(65) Prior Publication Data

US 2019/0381438 A1     Dec. 19, 2019

(30) Foreign Application Priority Data

Jun. 14, 2018   (DE) .......................... 10 2018 114 287

(51) Int. Cl.
*B01D 46/00* (2006.01)
*B32B 29/00* (2006.01)
(Continued)

(52) U.S. Cl.
CPC ....... *B01D 46/0001* (2013.01); *B01D 46/006* (2013.01); *B01D 46/10* (2013.01); *B26F 1/38* (2013.01); *B32B 7/12* (2013.01); *B32B 29/005* (2013.01); *B32B 37/12* (2013.01); *B32B 38/04* (2013.01); *F01N 3/023* (2013.01); *B01D 2275/10* (2013.01); *B01D 2279/30* (2013.01); *B32B 2038/042* (2013.01);
(Continued)

(58) Field of Classification Search
None
See application file for complete search history.

(56) References Cited

U.S. PATENT DOCUMENTS

| 5,120,384 A | * | 6/1992 | Yoshimitsu | ........... B29C 70/865 |
| | | | | 156/242 |
| 2016/0123201 A1 | * | 5/2016 | Silver | ..................... F02B 79/00 |
| | | | | 60/274 |

FOREIGN PATENT DOCUMENTS

| JP | 2004-150330 | | 5/2004 |
| JP | 02018071381 | * | 5/2018 |

OTHER PUBLICATIONS

German Search Report dated Apr. 17, 2019.

* cited by examiner

*Primary Examiner* — Linda L Gray
(74) *Attorney, Agent, or Firm* — Gerald E. Hespos; Michael J. Porco; Matthew T. Hespos

(57) ABSTRACT

A method is provided for producing at least one ash-forming element (1) for a particulate filter of an exhaust gas system of a gasoline engine or diesel engine. The method includes providing of a strip-shaped center layer (3), and making receiving holes (6) in the center layer (3). The method continues by providing of a strip-shaped bottom layer (4), and permanently connecting of the bottom layer (4) to the center layer (3). The method proceeds by filling the receiving holes (6) of the center layer (3) with ash-forming components (2), providing a strip-shaped top layer (5), and permanently connecting the top layer (5) to the center layer (3). The method then includes punching out of at least one ash-forming means (1) from the wafer, and making through-flow openings (7) in regions where there are no ash-forming components (2).

10 Claims, 1 Drawing Sheet

(51) Int. Cl.
  *B32B 37/00* (2006.01)
  *B32B 38/00* (2006.01)
  *F01N 3/00* (2006.01)
  *B26F 1/00* (2006.01)
  *B32B 37/12* (2006.01)
  *B32B 38/04* (2006.01)
  *F01N 3/023* (2006.01)
  *B01D 46/10* (2006.01)
  *B26F 1/38* (2006.01)
  *B32B 7/12* (2006.01)

(52) U.S. Cl.
  CPC ....... *B32B 2250/03* (2013.01); *B32B 2250/26* (2013.01); *B32B 2317/12* (2013.01)

METHOD FOR PRODUCING AT LEAST ONE ASH-FORMING MEANS FOR A PARTICULATE FILTER OF AN EXHAUST GAS SYSTEM OF A GASOLINE ENGINE

CROSS REFERENCE TO RELATED APPLICATION

This application claims priority under 35 USC 119 to German Patent Appl. No. 10 2018 114 287.0 filed on Jun. 14, 2018, the entire disclosure of which is incorporated herein by reference.

BACKGROUND

Field of the Invention

The invention relates to a method for producing at least one ash-forming means for a particulate filter of an exhaust gas system of a gasoline engine or diesel engine.

Related Art

The current statutory requirements for consumption reduction and the simultaneous tightening of the particulate limit values (mass and quantity) increasingly represent a challenge for the development of internal combustion engines. The adherence to future particulate limit values under the required boundary conditions will in future stand in the way of a consumption decrease. This leads to a necessity for almost all internal combustion engines to be equipped with a particulate filter in future, as already is the case for diesel engines.

Soot from combustion is separated in a particulate and is converted again into gaseous constituent parts by way of a targeted regeneration of the filter. Moreover, ash constituents that have their origin in engine oil additives and/or fuel additives remain permanently in the filter. Particulate filters that currently are used have two filter functions, namely, a depth filtration and a surface filtration. In the case of the depth filtration, the separating of the particles takes place in the wall of the particulate filter. In the case of the surface filtration, the filtration takes place on the surface of the filter. Over the service life, the particulate filter changes increasingly from a depth filter to a surface filter. The depth filtration is associated with a high pressure rise, since the permeability of the exhaust gas is influenced in a particularly negative manner in this case. If the pores in the wall are largely filled with soot, the soot consequently is deposited principally on the wall. Surface filtration leads to a moderate pressure rise that is lower than in the case of depth filtration. If the soot in the filter then is regenerated, the pressure dissipates with a hysteresis behavior, that is to say with a great pressure drop in the first step and subsequently with a moderate pressure drop.

In contrast to soot, ash always is deposited in the particulate filter on the wall and not in the wall. As a result, the depth filtration of the soot is prevented fundamentally and irreversibly, since the soot cannot penetrate the ash layer. For the pressure rise with an increasing deposit of soot, this means that a linear correlation without hysteresis is set over the entire range. As a result, the quality of the determination of the soot loading by way of a counterpressure measurement is improved significantly. Consequently, soot regeneration strategies can be controlled in a manner that is more targeted and optimum in terms of consumption.

It is already known to arrange an ash-forming means that comprises ash-forming components or ash between two components that are provided for conducting through exhaust gases during the production of an exhaust gas system of a gasoline engine that is equipped with a particulate filter. The ash-forming means also acts as a spacer to position the components of the exhaust gas system relative to one another. After the positioning of the at least two components by way of the ash-forming means that is arranged between them, the components are connected to one another permanently. Burning of the ash-forming means then takes place during the first heating operation of the exhaust gas system. As a result, the ash-forming components are released and are deposited on the particulate filter. Therefore, the ash-forming means ensure that the components of the exhaust gas system are positioned correctly with respect to one another during the manufacturing process and also ensure that these components maintain the required spacing from one another. The ash-forming means comprises ash-forming components, and thus the ash-forming means burns during the first heating operation of the exhaust gas system so that the ash-forming components are released and are deposited on the particulate filter.

An object of the invention is to provide a simple and inexpensive method for producing at least one ash-forming means for a particulate filter of an exhaust gas system of a gasoline engine or diesel engine.

SUMMARY

The invention relates to a method for producing at least one ash-forming means for a particulate filter of an exhaust gas system of a gasoline engine or diesel engine from a multiple-layer wafer that comprises ash-forming components or ash components or ash. The method comprises providing a strip-shaped center layer of the wafer, and making receiving holes in the center layer. The method continues by providing of a strip-shaped bottom layer of the wafer, and permanently connecting the bottom layer to the center layer. The method proceeds by filling the receiving holes of the center layer with the ash-forming components or ash components. The method further includes providing a strip-shaped top layer of the wafer, and permanently connecting the top layer to the center layer. The method then includes punching out at least one ash-forming means from the wafer, and making throughflow openings in those regions of the ash-forming means in which there are no ash-forming components.

The method according to the invention makes particularly simple and inexpensive production of the at least one ash-forming means possible. The ash-forming means produced by the method can be arranged, for example, at an inlet of a particulate filter of an exhaust gas system of a gasoline/diesel engine or at an outlet or inlet of a catalytic converter of the exhaust gas system.

As an alternative, the ash-forming means can be arranged between the particulate filter and the catalytic converter of the exhaust gas system. During the first heating operation of the exhaust gas system, the ash-forming components or ash components of the ash-forming means are released and deposited on the particulate filter. Ash-forming components released from an ash-forming means that is positioned directly upstream of the particulate filter can act only on the particulate filter and do not affect other engine components. The ash layer can be applied as a filter cake to the surface of the channel walls of the particulate filter. One particular advantage is that the particulate filter reaches its full filtration rate after the first heating operation of the exhaust gas system. The ash-forming components or ash components that form the ash layer after the burning operation preferably consist of elements that cannot be removed again during later operation by way of an oxidation or general stripping. Elements of this type are, for example, Ca, Mg, P, Zn, MgO, $Al_2O_3$ and CaO.

A center layer of the ash-forming means that is made from paper or cardboard has been found to be particularly satisfactorily suitable for receiving the ash-forming components. A bottom layer and/or a top layer made from paper or cardboard also is particularly effective. The strip-shaped layers produced from paper or cardboard are distinguished by their excellent combustion properties and by simple and inexpensive production. Thus, the layers made from paper or cardboard can be cut to size in a very simple manner. As an alternative, at least one of the layers can be produced from plastic.

The bottom layer and the top layer of one embodiment are connected to the center layer by adhesive bonding.

The receiving holes in the center layer may be formed by being punched out, thereby providing a particularly simple production of the receiving holes in the center layer for filling the ash-forming components. The receiving holes can have any desired shape, such as circular, oval or polygonal.

The throughflow openings in the at least one ash-forming means may be formed simply by being punched out. The throughflow openings can have any desired shape, such as circular, oval or polygonal.

In one embodiment the at least one ash-forming means is punched out of the wafer with a contour so that the ash-forming means can be used as a spacer element between two components of the exhaust gas system. Thus, the components are positioned properly relative to one another and exhaust gases can be conducted properly.

The at least one ash-forming means can be punched out from the wafer with an annular or circular contour. In particular, an ash-forming means that is configured as a ring is suitable in an advantageous way as a spacer element and can be arranged between the two components of the exhaust gas system that are provided for conducting through exhaust gases. As a result, the components can be positioned relative to one another and can be spaced apart from one another.

Plural ash-forming means may be punched out of the wafer. In this way, plural ash-forming means can be produced from a single wafer in a simple way and very inexpensively.

The ash-forming means produced by the above-described method has several advantages. For example, the ash can be applied precisely on the surface of the particulate filter. Additionally, the ash layer can be set precisely with regard to thickness and composition. Furthermore, the depth filtration is prevented in a targeted manner, and therefore a clear correlation between the counterpressure and the accumulated soot can be established. Still further, the filtration rate of prior art particulate filters assumes the desired value only after a certain running time. In contrast, the filtration rate reaches the required value by the use of the ash-forming means directly following the first heating operation of the exhaust gas system.

Further features and advantages of the invention will become clear using the following description with reference to the appended drawings.

DETAILED DESCRIPTION

Figure 1:
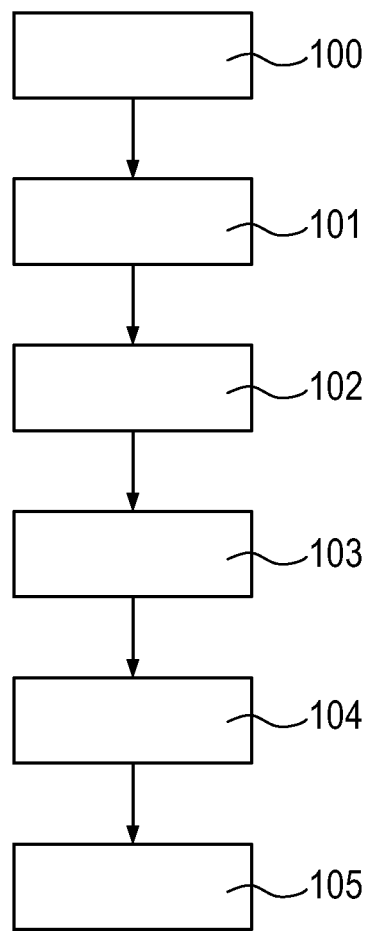
FIG. 1 is a flow chart that illustrates the steps of a method for producing an ash-forming means for a particulate filter of a gasoline engine or diesel engine from a wafer with ash-forming components.
Figure 2:
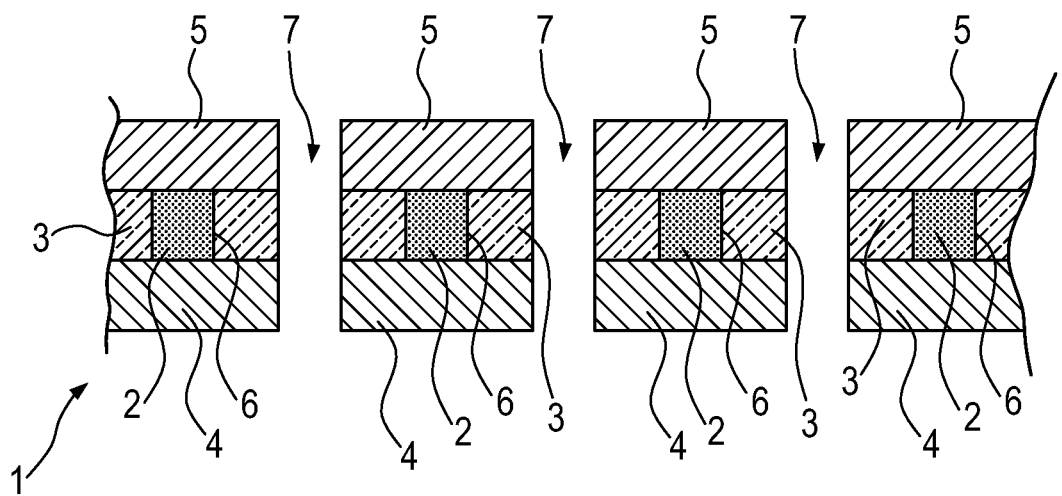
FIG. 2 is an enlarged, diagrammatically greatly simplified sectional view of a part of the ash-forming means produced by the method shown in FIG. 1.

An ash-forming means 1 for a particulate filter of a gasoline engine or diesel engine has ash-forming components 2, as shown in FIG. 2. The ash-forming means 1 has a center layer 3, a bottom layer 4 and a top layer 5 that are connected to one another.

An ash-forming means 1 of this type is produced from a wafer in the method described in the following text. In a first step 100, a strip-shaped center layer 3 is provided and is produced from paper or cardboard. Receiving holes 6 for receiving the ash-forming components 2 are made in the center layer 3. The receiving holes 6 can be produced by punching in a particularly simple way. The shape of the receiving holes 6 can be selected in any desired way. For example, receiving holes can be circular, oval or polygonal.

In a second step 101, a bottom layer 4 is provided and also preferably is a strip produced from paper or cardboard. The bottom layer 4 is connected permanently to the center layer 3 in a suitable way, such as by adhesive bonding.

In a further step 102, the receiving holes 6 of the center layer 3 are filled with ash-forming components or ash components 2, such as Mg, Ca, Al, Fe, MgO, CaO, $Al_2O_3$ and FeO. The layer thickness of the center layer 3 and the number and size of the receiving holes 6 that are punched into the center layer 3 define the quantity of ash-forming components 2 that can be received in the center layer 3.

After the ash-forming components 2 are introduced into the receiving holes 6 of the center layer 3, in a following step 103, a top layer 5 is provided. The top layer 103 is strip-shaped and also preferably is produced from paper or cardboard. The receiving holes 6 of the center layer 3 are closed by the top layer 5. The top layer 5 can be bonded adhesively to the center layer 3. As a result, a three-layer wafer is provided, in which the ash-forming components 2 are packed.

The wafer then is punched out in step 104 so that the ash-forming means 1 can be obtained with the desired contour. A plurality of ash-forming means 1 can be punched out from the wafer, so that plural ash-forming means 1 can be produced from a single wafer in a very simple and inexpensive manner. Each ash-forming means 1 punched out from the wafer is perforated in a step 105 to form throughflow openings 7 in which there are no ash-forming components 2. The throughflow openings 7 make an effective throughflow of the ash-forming means 1 by way of hot exhaust gases possible during use of the ash-forming means 1. The shape of the throughflow openings 7 can be selected in any desired way. For example, the throughflow openings 7 may be circular, oval or polygonal.

It has proven expedient that the ash-forming means 1 is punched out of the wafer with a contour such that the ash-forming means 1 can be used as a spacer element between two components of the exhaust gas system that are provided for conducting through exhaust gases. For example, the at least one ash-forming means 1 can be punched out from the wafer with an annular or circular contour.

The ash-forming means 1 produced in the above-described way can be arranged at an inlet of a particulate filter of an exhaust gas system of a gasoline engine or at an inlet or outlet of a catalytic converter of the exhaust gas system or between the particulate filter and the catalytic converter.

The ash-forming means 1 burns after the first start of the gasoline engine. As an alternative, the step can also be carried out by an external burner. In both cases, the ash-forming components 2 are released which, as a result, can form a filter cake for the particulate filter of the gasoline engine or diesel engine.

What is claimed is:

1. A method for producing at least one ash-forming means for a particulate filter of an exhaust gas system of a gasoline engine or diesel engine, the method comprising:
    providing a strip-shaped center layer;
    making receiving holes in the center layer;
    providing a strip-shaped bottom layer;
    permanently connecting the bottom layer to the center layer;
    filling the receiving holes of the center layer with the ash-forming components;
    providing a strip-shaped top layer
    permanently connecting the top layer to the center layer to form a wafer;
    punching out of at least one ash-forming means from the wafer; and
    making throughflow openings in those regions of the ash-forming means in which there are no ash-forming components.

2. The method of claim 1, wherein the center layer is made from paper or cardboard.

3. The method of claim 2, wherein the bottom layer is made from paper or cardboard.

4. The method of claim 3, wherein the top layer is made from paper or cardboard.

5. The method of claim 1, wherein the bottom layer and the top layer are connected to the center layer by adhesive bonding.

6. The method of claim 1, wherein the receiving holes are made in the center layer by being punched out.

7. The method of claim 1, wherein the throughflow openings are made in the at least one ash-forming means by being punched out.

8. The method of claim 7, wherein the at least one ash-forming means is punched out of the wafer with a contour so that that the ash-forming means can be used as a spacer element between two components of the exhaust gas system that are provided for conducting through exhaust gases.

9. The method of claim 1, wherein the at least one ash-forming means is punched out of the wafer with an annular or circular contour.

10. The method of claim 1, wherein a plurality of ash-forming means are punched out of the wafer.

* * * * *